April 27, 1954  C. K. STOTZ  2,676,520
DEVICE FOR SHAVING BLANKS
Filed June 20, 1952
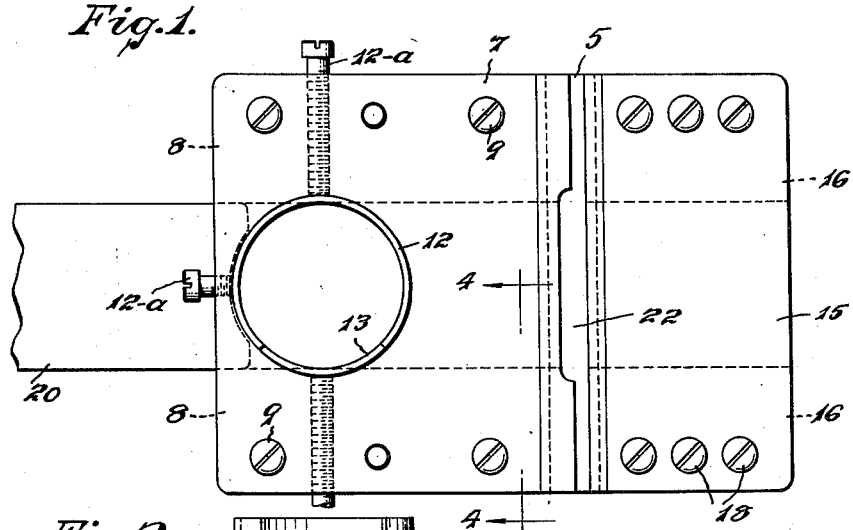
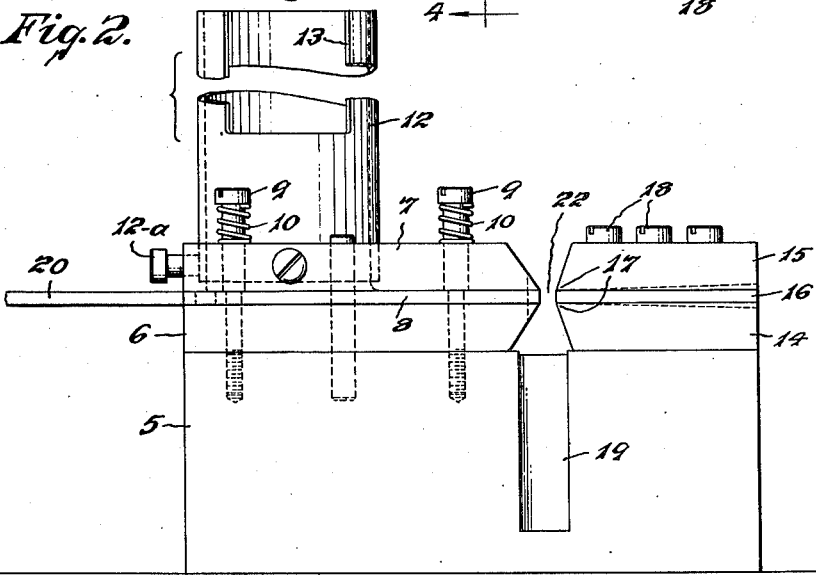
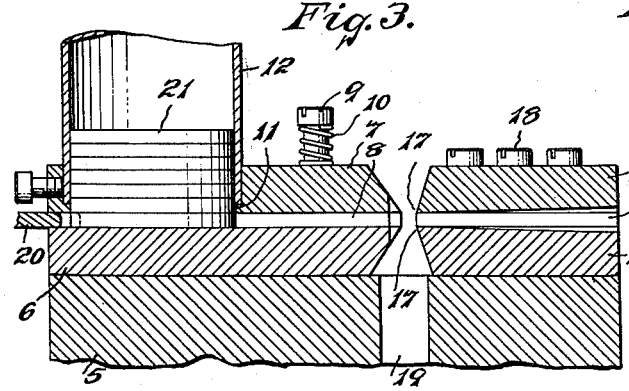
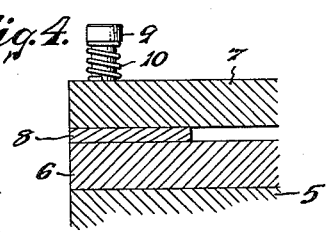
INVENTOR.
CHARLES K. STOTZ.
BY
*Louis V. Lucia*
ATTORNEY.

Patented Apr. 27, 1954

2,676,520

UNITED STATES PATENT OFFICE 2,676,520

DEVICE FOR SHAVING BLANKS

Charles K. Stotz, Winsted, Conn., assignor to Cha-Gobe Company, Inc., Hartford, Conn., a corporation of Connecticut Application June 20, 1952, Serial No. 294,739

5 Claims. (Cl. 90—24)

This invention relates to a device for shaving blanks, and more particularly to such a device which is adapted for shaving opposite surfaces of metal discs for producing uniformity and accuracy in the thickness of such discs.

It is an object of this invention to provide such a device which will rapidly shave opposite sides of metal blanks and reduce them to accurate thicknesses within extremely close tolerances.

A further object of this invention is to provide such a device which will produce smooth surfaces upon the shaved sides of the metal blanks.

Further objects and advantages of this invention will be more clearly understood from the following description and from the accompanying drawings in which:

Fig. 1 is a plan view of the shaving device embodying my invention.

Fig. 2 is a side view of said device.

Fig. 3 is a side view in central vertical section.

Fig. 4 is a sectional end view of a portion of the said device on line 4—4 of Fig. 2.

In the embodiment of the invention which is illustrated in the drawings, the numeral 5 denotes a base upon which there is mounted a bottom plate 6 and a top plate 7. The said bottom and top plates are vertically spaced by suitable spacing bars 8 and secured to the base by means of screws 9 which extend through the said top plate, spacing bars and bottom plate and are threaded to the base. A shoulder is provided on each of the screws for rigidly securing the spacing bars to the bottom plate upon the base and the upper portions of the said screws provide upright posts on which the top plate is vertically slidable.

A spring 10 is mounted upon each of the said posts for urging the top plate 7 into contact with the spacing bars 8 so as to thereby normally retain the said top plate in position upon the spacing bars, as clearly shown in Fig. 4.

The said top plate has an opening 11 therein and a magazine, preferably in the form of a tube 12, vertically mounted on said top plate, over the said opening, and rigidly secured thereto by means of screws 12-a. The said magazine is provided with a slot 13 at one side thereof so as to render visible a stack of blanks contained therein.

Upon the base 5 there are also mounted bottom and top cutter plates, 14 and 15, respectively, which are separated by means of spacing bars 16—16, each of which has a cutting edge 17 in the front edge portion thereof. The said cutting bars and spacing bars are rigidly secured upon the base 5 by means of screws 18.

The rear edges of the plates 6 and 7 are spaced from the front cutting edges of the cutter plates 14 and 15, as shown at 17, and there is provided in the base 5 a groove 19 which is directly under the said space and preferably slanted toward one side of the base so as to dispose of the chips which drop from the cutter plates during the operation of the device.

A plunger 20, which may be driven by any suitable power means, is slidable between the spacing bars 8—8 so as to push the blanks through the knife plates from the bottom of the stack.

The operation of the above described device, for shaving the opposite sides of a stack of circular blanks, indicated at 21, is as follows:

A stack of the blanks are placed into the magazine 12 and allowed to rest upon the top of the bottom plate 6 as shown in Fig. 3. When the plunger 20 is forced forwardly, it will engage the bottom-most blank 21 and pass it between the bottom and top plates 6 and 7, across the space 22, and between the said bottom and top cutter plates. As the said blank passes the cutting edges 17 of the cutter plates, the opposite surfaces of the blank will be simultaneously shaved and the chips therefrom will remain in the space 22, during the shaving operation, and then drop into the groove 19.

In order to prevent chatter, as the blank is being forced through the cutter plates, it is important that the blank be accurately positioned and securely held as it passes through the opposed cutting edges 17—17. This is accomplished by the vertical yielding movement of the top plate 7 which is provided under the pressure of the springs 10 that operates to firmly hold the blank between the adjacent surface of the said bottom and top plates as the blank is pushed past the cutting edges.

It has been found that the above described device is capable of shaving chips of substantial thickness off the opposite sides of blanks and producing shaved blanks with extremely accurate and uniform thickness dimensions and smooth surfaces; the said results being primarily due to the movable top plate 7 acting under the pressure of the springs 10 to firmly hold the blank in position as it is being passed through the shaving device.

I claim:

1. A device for shaving articles comprising a supporting plate, a top plate spaced from the supporting plate and vertically movable relatively thereto, a magazine carried upon said top plate, cutting means adjacent to the supporting plate and the top plate, a plunger for forcing an article dispensed from said magazine between the supporting plate and the top plate and through said cutting means, and resilient means including said top plate for slidably retaining the said article upon the supporting plate as it is pushed between the cutting means by the plunger.

2. An article shaving device comprising a bottom plate, a top plate spaced from the bottom plate and vertically slidable relatively thereto, spring means urging said top plate towards the bottom plate, a magazine carried by the top plate and disposed vertically thereon, cutting means adjacent to the bottom and the top plates, and a plunger for forcing an article from said magazine between the said bottom and the top plates and past the said cutting means.

3. A device for shaving blanks comprising a base, a supporting plate secured to said base, a pair of spacing bars upon said supporting plate, a top plate resting upon said spacing bars, spring means urging said top plate towards the spacing bars, a magazine carried upon said top plate, a pair of spaced cutting plates having cutting edges adjacent the supporting and the top plates, and a plunger for forcing an article from said magazine between said supporting and said top plates and therefrom between said cutting edges.

4. A device for shaving blanks comprising a base, a supporting plate rigidly secured to the base, a pair of spaced spacing bars rigidly secured to said supporting plate, a top plate resting upon said spacing bars and vertically guided thereon, spring means urging said top plate towards the spacing bars, a magazine carried upon said top plate, a pair of cutting plates secured to said base, spacing bars between said cutting plates, the said cutting plates being spaced from the supporting and the top plates and the said base having a groove underlying the space therebetween and slanted towards one side of the said base, and a plunger for forcing a blank between said plates.

5. A device for shaving blanks including a base, a supporting plate mounted on said base, a top plate movable relatively to said supporting plate, means for spacing said top plate from the supporting plate, a magazine carried by said top plate and movable therewith relatively to the supporting plate, the said magazine communicating with the space between the supporting and top plates through and opening in the top plate, spring means urging said top plate towards the supporting plate, and cutting means having cutting edges spaced from the said plates.

References Cited in the file of this patent

UNITED STATES PATENTS

| Number | Name | Date |
|---|---|---|
| 178,322 | North | June 6, 1876 |
| 715,525 | Tyberg | Dec. 9, 1902 |
| 1,783,121 | Hoern | Nov. 25, 1930 |
| 1,958,147 | Kelley et al. | May 8, 1934 |
| 1,968,840 | Linn | Aug. 7, 1934 |